(12) United States Patent
Ahn et al.

(10) Patent No.: US 11,814,012 B2
(45) Date of Patent: Nov. 14, 2023

(54) MOVING CONSOLE FOR VEHICLE

(71) Applicants: Hyundai Motor Company, Seoul (KR); KIA Corporation, Seoul (KR)

(72) Inventors: Gye Young Ahn, Seoul (KR); Kyoung Sik Kim, Ansan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 119 days.

(21) Appl. No.: 17/407,496

(22) Filed: Aug. 20, 2021

(65) Prior Publication Data

US 2022/0234508 A1 Jul. 28, 2022

(30) Foreign Application Priority Data

Jan. 27, 2021 (KR) .................. 10-2021-0011686

(51) Int. Cl.
*B60R 7/04* (2006.01)

(52) U.S. Cl.
CPC ..................... *B60R 7/04* (2013.01)

(58) Field of Classification Search
CPC .............. B60R 7/04; B60R 2011/0007; B60R 2011/0084; B60R 2011/0092; B60H 1/246; B60H 1/00564; B60H 1/34; B60N 2/793; F16L 37/0847
USPC .................. 296/37.8, 24.34, 208, 190.09
See application file for complete search history.

(56) References Cited

U.S. PATENT DOCUMENTS

| | | | | |
|---|---|---|---|---|
| 2006/0258282 | A1* | 11/2006 | Heck | B60H 1/244 |
| | | | | 454/143 |
| 2007/0205623 | A1* | 9/2007 | Hung | B60R 7/04 |
| | | | | 296/208 |
| 2009/0179449 | A1* | 7/2009 | Shibata | B60N 3/104 |
| | | | | 296/37.8 |
| 2017/0072772 | A1* | 3/2017 | Salter | B60H 1/246 |
| 2017/0080871 | A1* | 3/2017 | Mizobata | B60H 1/246 |
| 2020/0156553 | A1 | 5/2020 | Kang et al. | |

FOREIGN PATENT DOCUMENTS

| | | | |
|---|---|---|---|
| DE | 10 2019 003 117 A1 | 11/2020 | |
| EP | 2030836 A1 * | 3/2009 | ........... B60H 1/0055 |
| FR | 3 075 697 A1 | 6/2019 | |
| JP | 2004-210006 A | 7/2004 | |
| JP | 2004210006 A * | 7/2004 | |

(Continued)

OTHER PUBLICATIONS

Extended European Search Report dated Dec. 6, 2021, issued in corresponding European Patent Application No. 21192406.3.

*Primary Examiner* — Joseph D. Pape
(74) *Attorney, Agent, or Firm* — Morgan, Lewis & Bockius LLP

(57) ABSTRACT

A moving console for a vehicle may include a housing being configured for linear sliding on a vehicle body; a moving duct mounted in the housing and being configured for linear sliding together with the housing; a connecting duct being configured for linear sliding relative to the leaner sliding of the moving duct and to supply air received from a fixed duct fixed to the vehicle body to the moving duct; and a locking device configured to lock or unlock the connecting duct at a position where an entrance of the connecting duct fluidically communicates with the fixed duct.

14 Claims, 12 Drawing Sheets

(56) References Cited

FOREIGN PATENT DOCUMENTS

| | | | |
|---|---|---|---|
| KR | 10-1987006 B1 | 6/2019 | |
| KR | 10-1987030 B1 | 6/2019 | |
| KR | 2020-0063280 A | 6/2020 | |
| WO | WO-2019096758 A1 * | 5/2019 | ......... B60H 1/00028 |
| WO | WO-2020221585 A1 * | 11/2020 | ......... B60H 1/00528 |

* cited by examiner

MOVING CONSOLE FOR VEHICLE

CROSS REFERENCE TO RELATED APPLICATION

The present application claims priority to Korean Patent Application No. 10-2021-0011686, filed Jan. 27, 2021, the entire contents of which is incorporated herein for all purposes by this reference.

BACKGROUND OF THE INVENTION

Field of the Invention

The present invention relates to a console mounted to a vehicle.

Description of Related Art

A console is provided in a vehicle with a space for storing objects therein, and conventionally, the console is fixed to a vehicle body.

In a future vehicle, a seat is not fixed to the vehicle body, but move multiple seat variation may be required such that the seat may be moved backward, forward, left and right and may be swiveled.

Therefore, it is necessary that the console is not fixed to the vehicle body, but is movably mounted to the vehicle body to correspond to changes in seat position or posture.

Furthermore, when the console is provided to be movable relative to the vehicle body and configured to discharge hot or cool air supplied from an air conditioning device of the vehicle, vehicle indoor temperature control and air conditioning performance may be secured even when a vehicle where a B pillar is not provided and thus installation of an air conditioning vent is difficult.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a moving console for a vehicle, wherein the moving console is provided in a vehicle body to be movable within a predetermined range relative to the vehicle body, thus being advantageous in securing different vehicle seat variations and being configured for discharging hot or cool air supplied from a vehicle air conditioning device while having mobility as described above, so that it is possible to easily control vehicle indoor temperature and air conditioning.

According to various aspects of the present invention, there is provided a moving console for a vehicle. The moving console includes: a housing which is slidable on a vehicle body; a moving duct mounted in the housing and configured to linearly slide together with the housing; a connecting duct configured to slide relative to sliding of the moving duct and to supply air received from a fixed duct fixed to the vehicle body to the moving duct; and a locking device configured to lock or unlock the connecting duct at a position where an entrance of the connecting duct may communicate with the fixed duct.

The moving duct may include a straight section which may be configured to overlap with the connecting duct while being fitted over a portion of the connecting duct, maintaining in fluidical communication with the connecting duct continuously even when the moving duct linearly slides in a direction away from the connecting duct.

The locking device may include: a stopper fixed to the vehicle body; a locking lever rotatably connected to the connecting duct, wherein a locked state of the locking lever to the stopper is changed according to a rotation angle of the locking lever; and a locking spring configured to apply elastic force to the locking lever in a direction in which the locking lever is locked to the stopper.

The locking device may include: a locking release portion fixed to the moving duct to release the locking state of the locking lever to the stopper as the moving duct slides in a direction closer to the connecting duct.

The stopper may be positioned below the connecting duct; the locking release portion may be configured to enter a gap between an upper end portion of the stopper and the connecting duct by sliding thereof; and the locking lever may be positioned below the connecting duct so that the shaft may be positioned below a linear sliding trajectory of the locking release portion.

The locking lever may include: a hook arm configured to be locked to the stopper by the elastic force of the locking spring; and a release arm integrally formed with the hook arm to be selectively rotated by the locking release portion to release the hook arm from the stopper.

The locking lever may include: a restraining arm configured to restrain relative sliding of the connecting duct and the moving duct by the elastic force of the locking spring when the hook arm of the locking lever is released from the stopper.

The locking release portion may be provided on a lower plate fixed to a lower side of the moving duct, wherein the lower plate may have a restraining hole into which the restraining arm of the locking lever may be inserted to restrain the moving duct relative to the connecting duct.

The stopper integrally may have a guide portion, which may guide the hook arm to be rotated and allow the restraining arm to be released from the restraining hole and then allow the hook arm to be locked to the stopper as the locking lever approaches to the stopper with the restraining arm inserted in the restraining hole.

In the housing, a storage box may be provided above the straight section of the moving duct configured to overlap with the connecting duct; the moving duct may be fixed to the storage box; the shaft of the locking lever may be fixed to a lower moving block integrally provided at a lower side of the connecting duct; and the locking release portion may be provided at a lower plate fixed to a lower side of the moving duct.

The connecting duct may include a straight guide provided on an upper side thereof to guide linear sliding of the connecting duct relative to the storage box.

An upper moving block may be provided above the connecting duct and coupled to an upper side of the lower moving block; and the straight guide may be provided between the upper moving block and the storage box.

The moving console may include: a slider fixed to a lower side of the lower plate; guide rails securely provided on the vehicle body to guide linear sliding of the slider relative to the vehicle body; and a drive motor configured to supply power for moving the slider along the guide rails so that the lower plate, the moving duct, and the housing perform linear sliding.

The moving console may include: a restraining device configured to restrain the relative sliding of the connecting duct and the moving duct when the locking device is unlocked and the connecting duct is separated from the fixed duct.

The restraining device may be configured to be operated in conjunction with the locking device.

The present invention is configured to be movable within a predetermined range relative to the vehicle body, being advantageous in securing different vehicle seat variations. The present invention is configured to discharge hot or cool air supplied from the vehicle air conditioning device while having mobility as described above, easily controlling vehicle indoor temperature and air conditioning.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
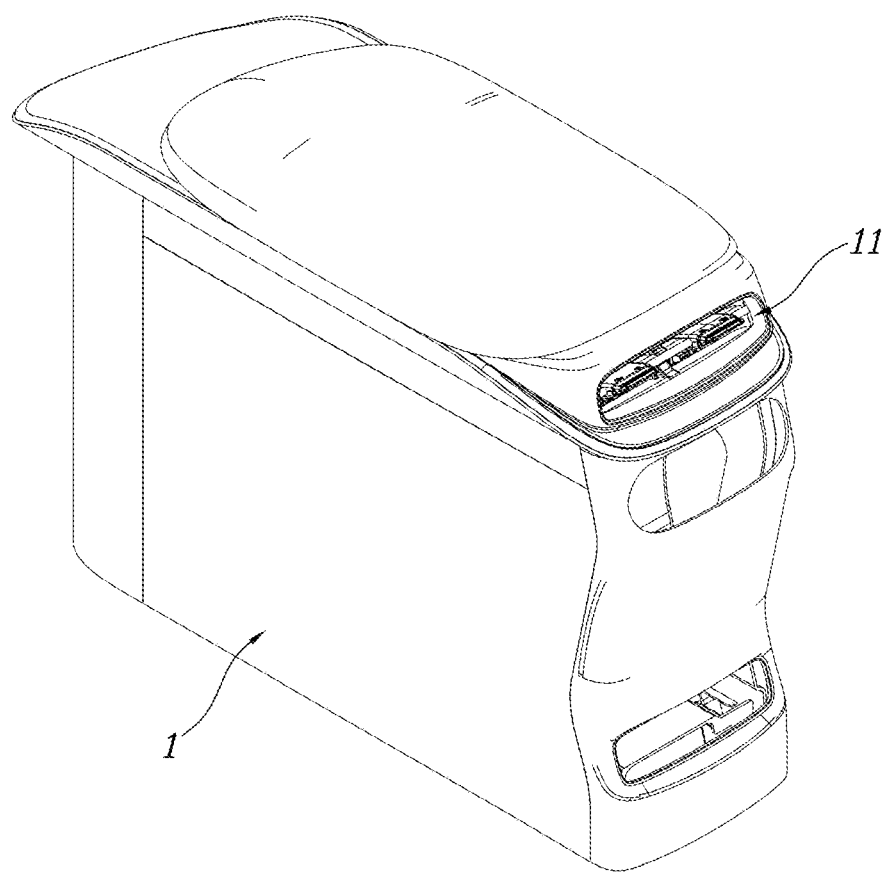
FIG. 1 is a view showing the exterior of a housing of a moving console for a vehicle according to various exemplary embodiments of the present invention.
Figure 2:
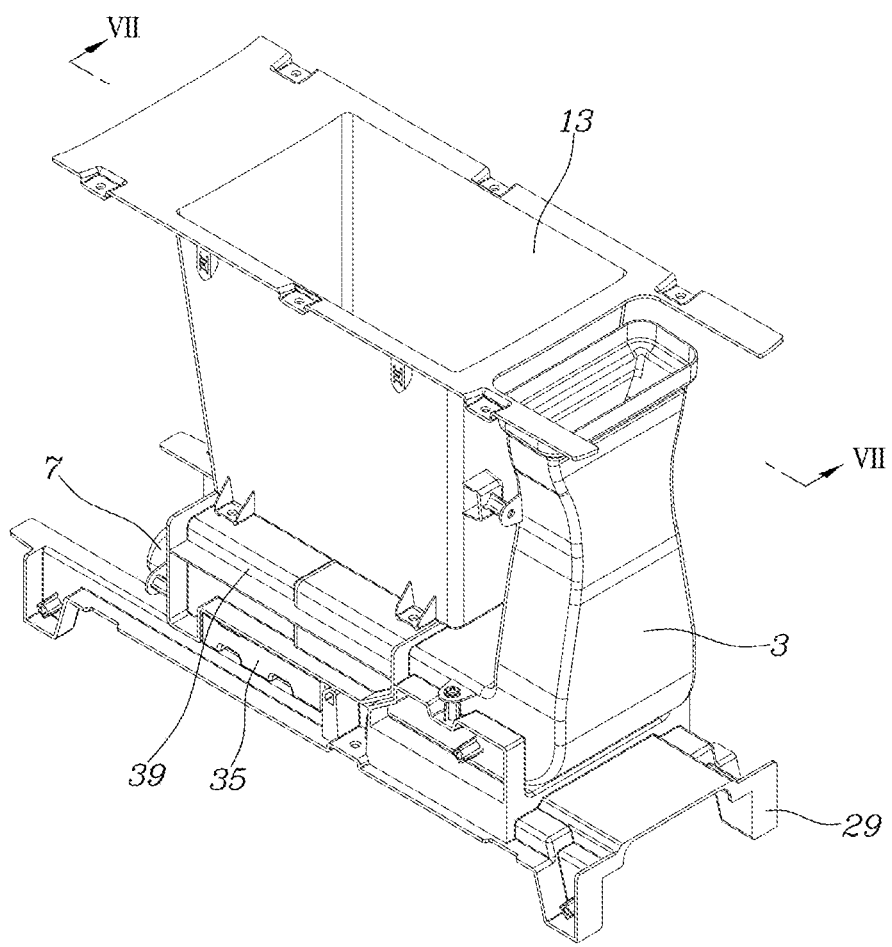
FIG. 2 is a view showing the interior of the moving console in a state of removing the housing in FIG. 1.
Figure 3:
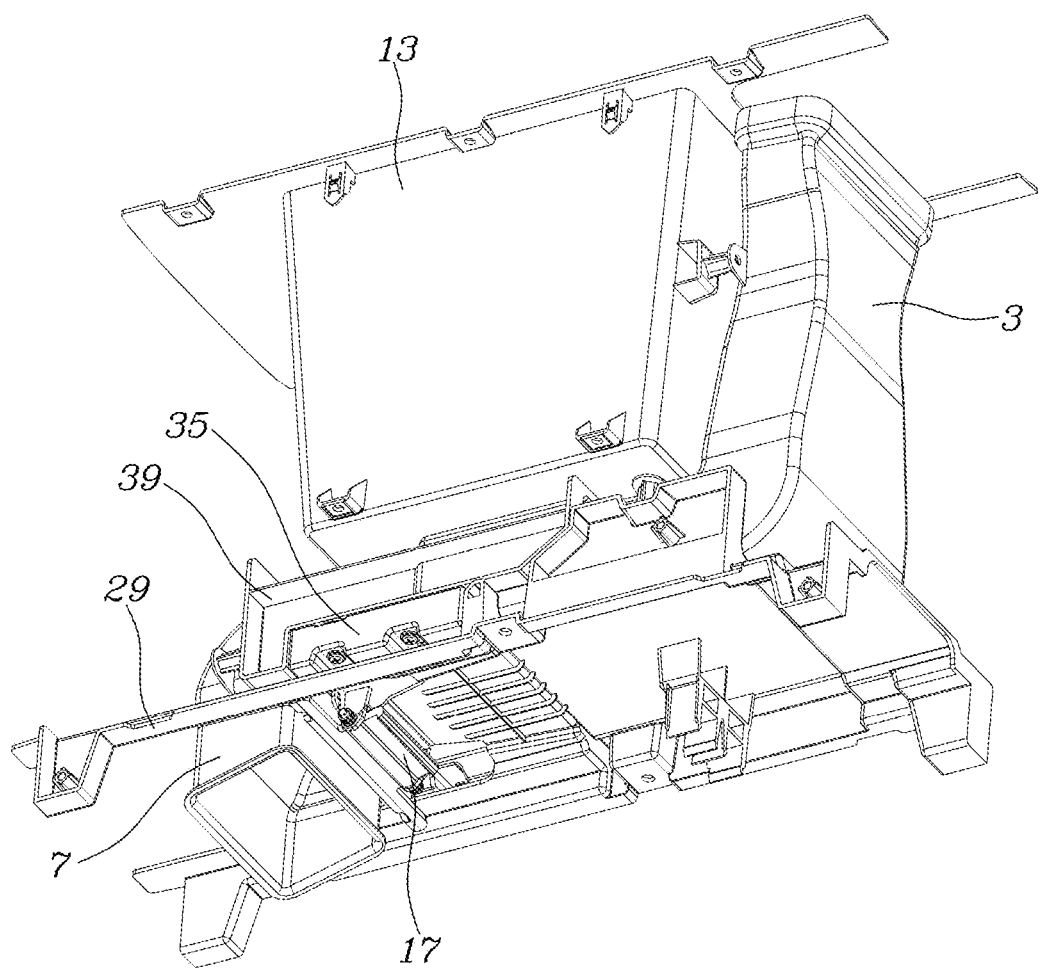
FIG. 3 is a view showing the configuration of the moving console in FIG. 2 by being taken at a different angle from FIG. 2.
Figure 4:
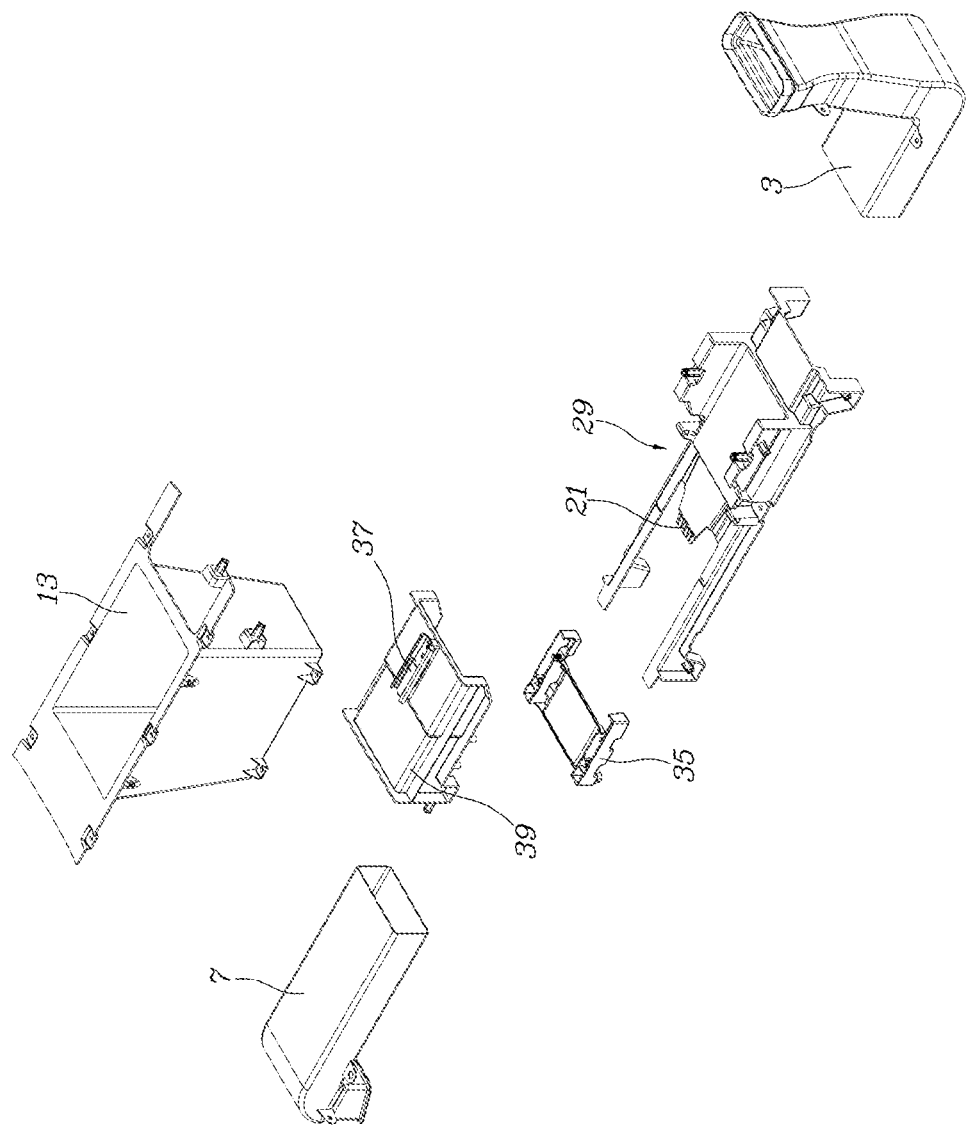
FIG. 4 is a disassembled perspective view showing the configuration of the moving console in FIG. 2.
Figure 5:
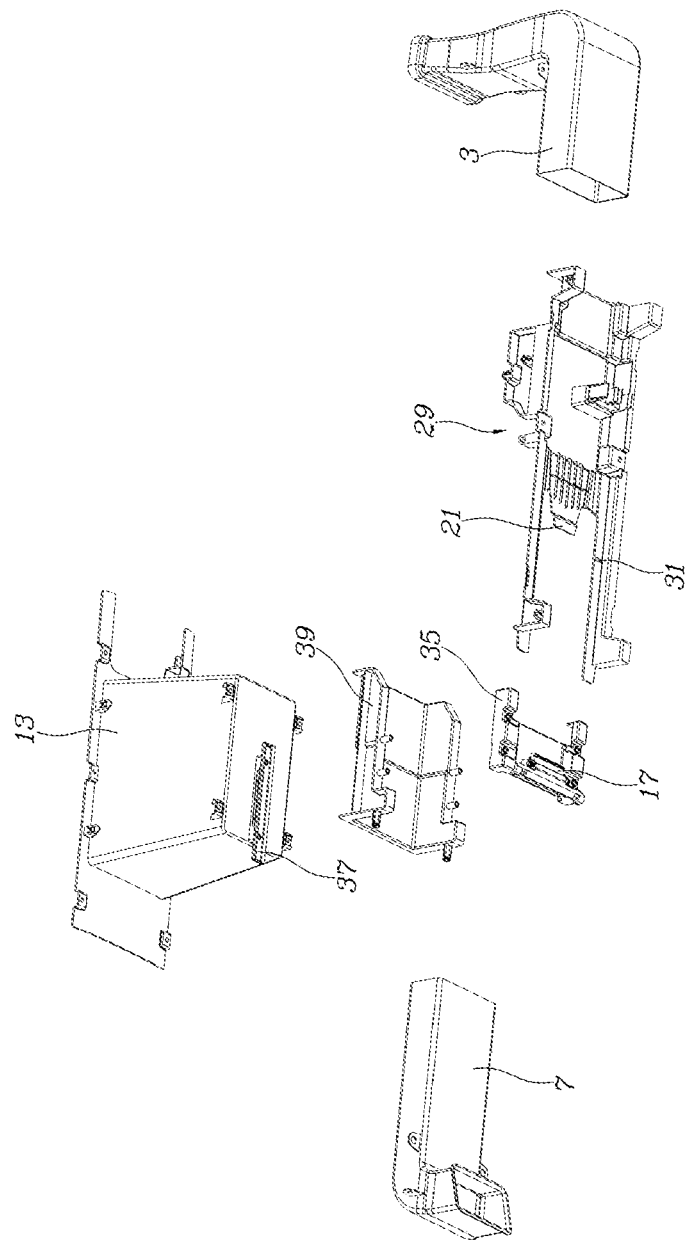
FIG. 5 is a view showing the configuration of the moving console in FIG. 4 by being taken at a different angle from FIG. 4.
Figure 6:
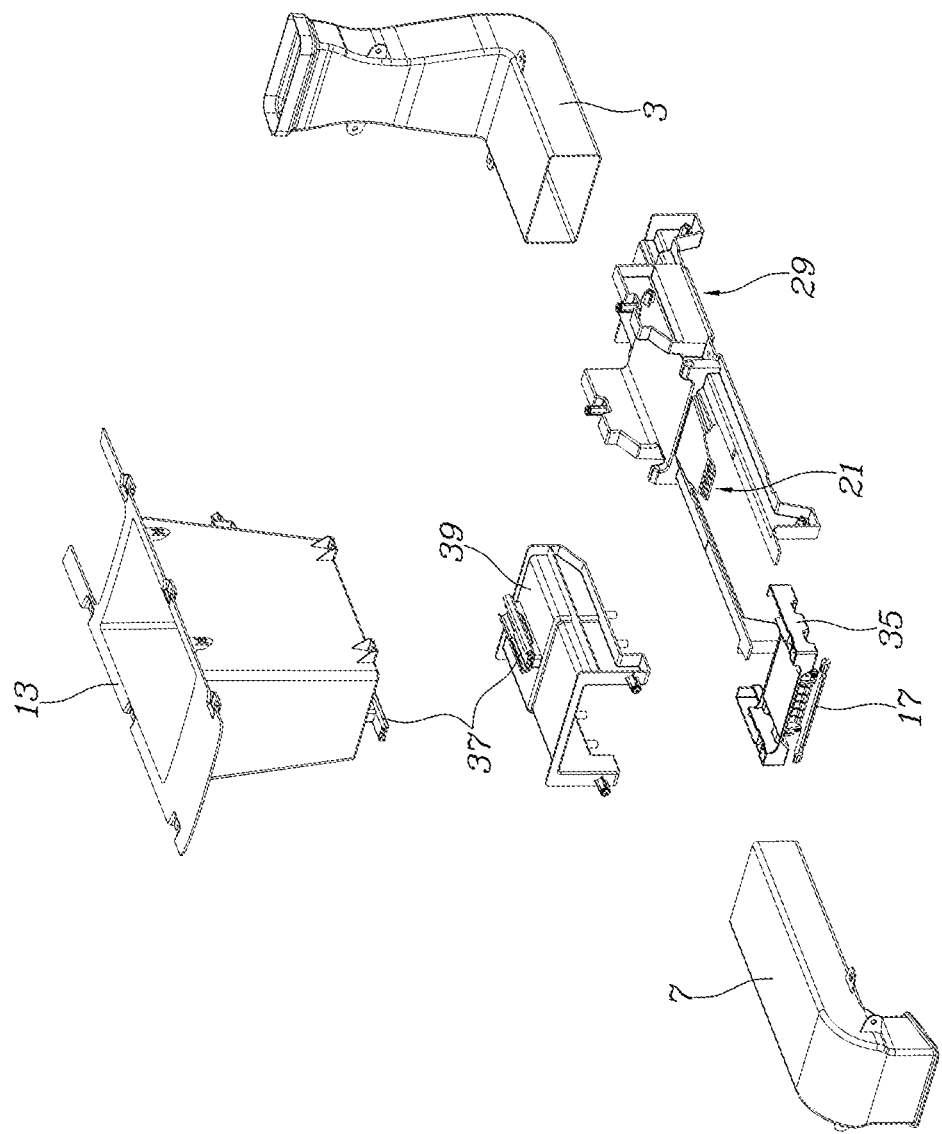
FIG. 6 is a view showing the configuration in FIG. 4 by being taken at a different angle from FIG. 4.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

In the following description, the structural or functional description specified to exemplary embodiments according to the concept of the present invention is directed to describe the exemplary embodiments of the present invention, so it may be understood that the present invention may be variously embodied, without being limited to the exemplary embodiments.

An exemplary embodiment described herein may be changed in various ways and various shapes, so a specific embodiment is shown in the drawings and will be described in detail in the exemplary embodiment of the present invention. However, it may be understood that the exemplary embodiments according to the concept of the present invention are not limited to the exemplary embodiments which will be described hereinbelow with reference to the accompanying drawings, but all of modifications, equivalents, and substitutions are included in the scope and spirit of the present invention.

It will be understood that, although the terms first or second, etc. may be used herein to describe various elements, but these elements may not be limited by these terms. These terms are only used to distinguish one element, from another element. For instance, a first element discussed below could be termed a second element without departing from the teachings of the present invention. Similarly, the second element could also be termed the first element.

It is to be understood that when one element is referred to as being "connected to" or "coupled to" another element, it may be directly connected to or directly coupled to another element or be connected to or coupled to another element, having the other element intervening therebetween. On the other hand, it is to be understood that when one element is referred to as being "directly connected to" or "directly coupled to" another element, it may be connected to or coupled to another element without the other element intervening therebetween. Furthermore, the terms used herein to describe a relationship between elements, that is, "between", "directly between", "adjacent" or "directly adjacent" may be interpreted in the same manner as those described above.

The terminology used herein is for describing various exemplary embodiments only and is not intended to limit the present invention. Singular forms are intended to include plural forms unless the context clearly indicates otherwise. It will be further understood that the terms "comprises" or "have" used in the exemplary embodiment, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those skilled in the art to which various exemplary embodiments of the present invention belongs. It may be understood that the terms defined by the dictionary are identical with the meanings within the context of the related art, and they may not be ideally or excessively formally defined unless the context clearly dictates otherwise.

Hereinbelow, of the present invention an exemplary embodiment of the present invention will be described in detail with reference to accompanying drawings. Like reference numerals provided in the drawings indicate like components.

Referring to FIGS. 1 to 10, according to the exemplary embodiment of the present invention, a moving console for a vehicle includes: a housing 1 configured to linearly slide to a vehicle body; a moving duct 3 disposed in the housing 1 and configured to linearly slide together with the housing 1; a connecting duct 7 configured to linearly slide relative to the moving duct 3 and to supply air received from a fixed duct 5 fixed to the vehicle body to the moving duct 3; and a locking device 9 configured to lock or unlock the connecting duct 7 at a position where an entrance of the connecting duct 7 communicates with the fixed duct 5.

That is, the moving console of in various aspects of the present invention, the housing 1 of the moving console is provided to be linearly slidable relative to the vehicle body, so a position of the moving console may be easily changed. The moving console enables a seat position and a swiveling state of the vehicle to be variously changed, so that the vehicle has advantageous in securing different seat variations. Furthermore, the console is configured such that the moving duct 3 may discharge hot or cool air supplied from the fixed duct 5 through the connecting duct 7 into the vehicle room while the housing 1 of the console is moved, so temperature control and air conditioning performance of the vehicle may be efficiently satisfied.

Therefore, the present invention may be used in a future vehicle in which hot or cool air supply through a B pillar is not available since the B pillar is eliminated to efficiently secure the temperature control and air conditioning performance of the vehicle.

The housing 1 includes a vent 11 discharging hot or cool air supplied through the moving duct 3 and a storage box 13 configured for storing objects therein by opening a cover at the upper side of the housing.

As an example, in the exemplary embodiment of the present invention, the housing 1 is described on the premise that the housing 1 is configured for linearly sliding in forward and rearward directions with respect to the vehicle body, but the direction of linear sliding may be variously changed depending on the situation.

The fixed duct 5 is fixed to the floor of the vehicle body and includes an outlet. The outlet of the fixed duct 5 is open upward so that hot or cool air supplied from air conditioning devices such as an air conditioner, a heater, or the like positioned in the front of the vehicle may be supplied toward the entrance of the connecting duct 7 through the outlet of the fixed duct 5.

The moving duct 3 has the straight section overlapping with the connecting duct 7 while being fitted over the outside of the connecting duct 7. Whereby, even when the moving duct 3 linearly slides in a direction away from the connecting duct 7, fluidical communication between the moving duct 3 and the connecting duct 7 may be continuously maintained.

In the exemplary embodiment of the present invention, the direction in which the moving duct 3 is away from the connecting duct 7 may be understood as the rear of the vehicle body.

Figure 11A:
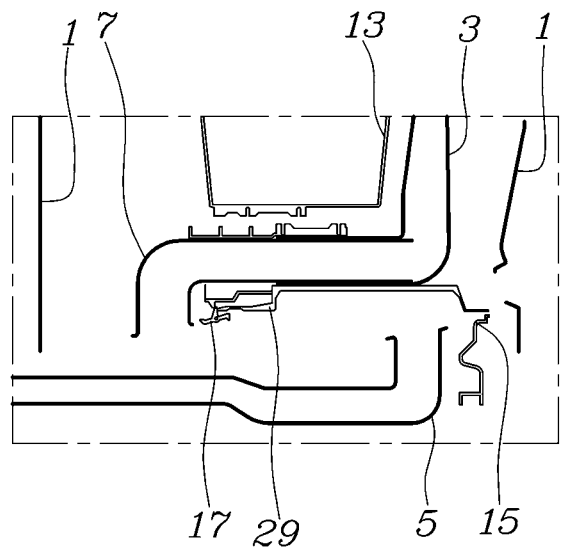
FIG. 11A, FIG. 11B, and FIG. 11C are views showing the moving console according to various exemplary embodiments of the present invention with three states that the moving console may implement.
Figure 11B:
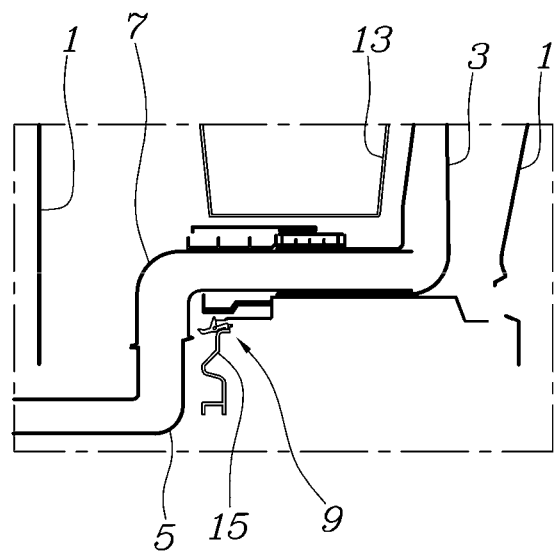
Figure 11C:
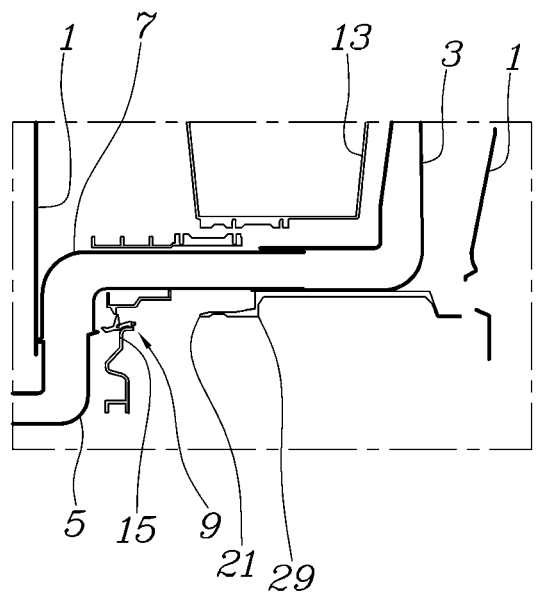

As an example, in FIG. 11, three states that the moving console of the present invention may implement are compared with states A, B, and C. When state B is the reference state, state A represents a state in which the moving duct 3 is moved forward relative to the vehicle body, and state C represents a state in which the moving duct 3 is moved rearward relative to the vehicle body.

The locking device 9 includes: a stopper 15 fixed to the vehicle body; a locking lever 17 configured to be rotatable about a shaft 20 fixed to the connecting duct 7 and of which a locked state to the stopper 15 is varied in a response to the rotation angle; and a locking spring 19 configured to apply elastic force in a direction in which the locking lever 17 is locked to the stopper 15.

That is, as the locking device 9 is configured such that the locking lever 17 is locked to the stopper 15 by the elastic force of the locking spring 19, the connecting duct 7 may be locked to the stopper 15 and stably maintain the reference state B in FIG. 11 without being moved forward or rearward relative to the vehicle body.

When the moving duct 3 and the storage box 13 are moved rearward relative to the vehicle body and the state is turned from the reference state to the state C, the locking device 9 allows the connecting duct 7 to be maintained in the stable locked state by the stopper 15 without being moved rearward together with the moving duct 3 and the storage box 13. Accordingly, the state of the connecting duct 7 fluidically-communicating with the fixed duct 5 may be stably secured.

Therefore, even in state C in FIG. 11, the hot or cool air supplied through the fixed duct 5 may be discharged to the vent 11 through the connecting duct 7 and the moving duct 3.

The locking device 9 includes a locking release portion 21 fixed to the moving duct 3. The locking release portion is provided to release the locked state of the locking lever 17 as the moving duct 3 linearly slides in a direction closer to the connecting duct 7.

That is, when the moving duct 3 is moved from state B to state A in FIG. 11, the locking release portion 21 may allow the locking lever 17 to be released from the locked state thereof.

However, the locking release portion 21 is not configured to release the locked state of the locking lever 17 while the moving duct 3 is moved from state C to state B in FIG. 11.

That is, while the moving duct 3 is moved from state C to state B in FIG. 11, the locking lever 17 may maintain the securely locked state to the stopper 15. Alternately, to move the moving duct 3 from state B to state an in FIG. 11, the moving duct 3 may be moved together with the connecting duct 7. Therefore, the locking release portion 21 releases the locked state of the locking lever 17 so that the connecting duct 7 may be disconnected from the stopper 15 and slide forward thereof.

In the exemplary embodiment of the present invention, the stopper 15 is positioned below the connecting duct 7; the locking release portion 21 is configured to enter a gap between an upper end portion of the stopper 15 and the connecting duct 7 by linearly sliding; and the locking lever 17 is positioned below the connecting duct 7 so that the shaft of the locking lever 17 is positioned below a linear sliding trajectory of the locking release portion 21.

The locking lever 17 includes: a hook arm 23 configured to be locked to the stopper 15 by the elastic force of the locking spring 19; and a release arm 25 integrally formed with the hook arm 23 to be rotated by the locking release portion 21 to release the hook arm 23 from the stopper 15.

Figure 7:
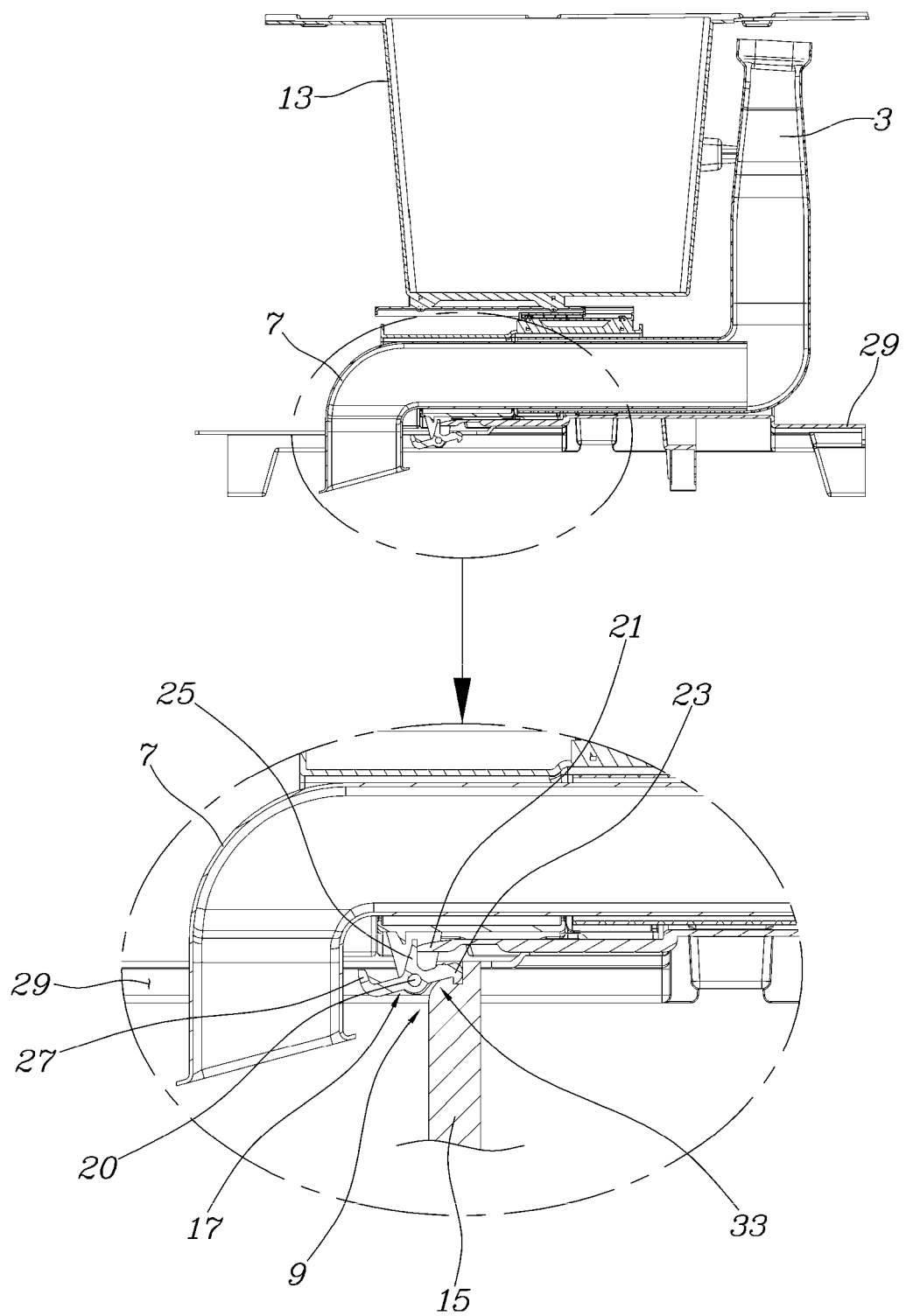
FIG. 7 is a sectional view taken along line VII-VII in FIG. 2.
Figure 8:
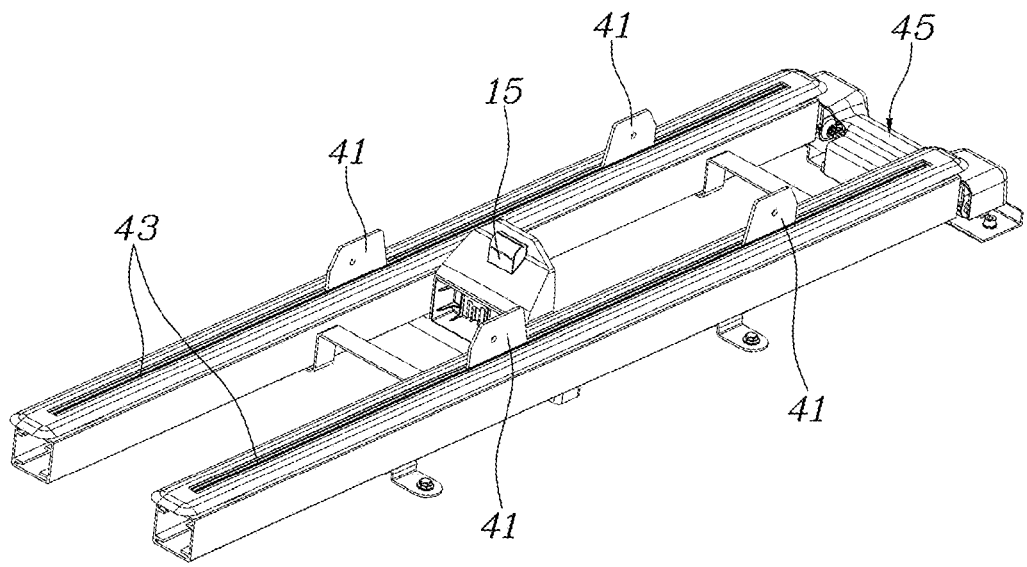
FIG. 8 is a view showing a slider and guide rails where the housing of the present invention is coupled to the upper side of the slider and the guide rails to slide.
Figure 9:
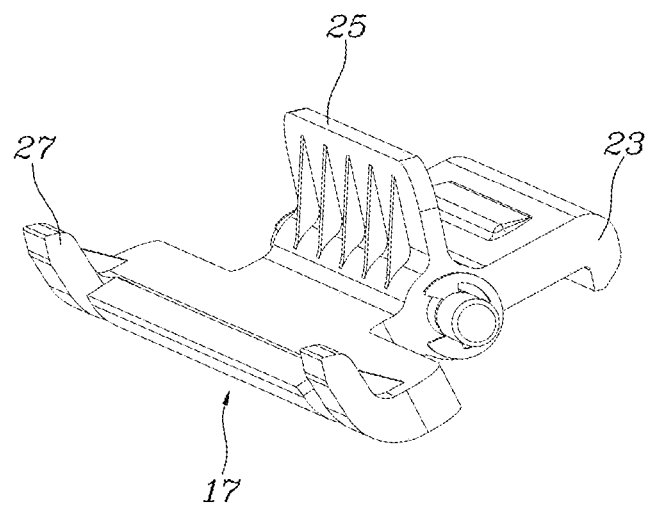
FIG. 9 is a view showing a locking lever according to various exemplary embodiments of the present invention.
Figure 10:
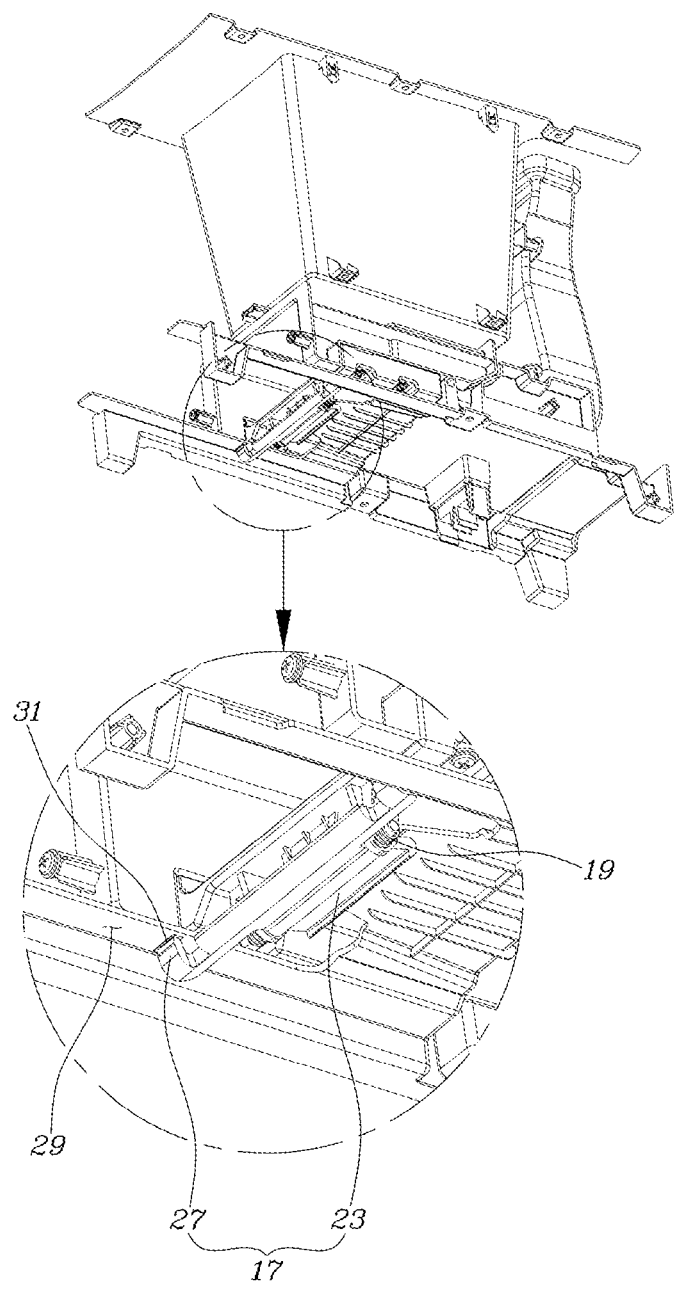
FIG. 10 is a view showing a restraining arm of the locking lever and a restraining hole of a lower plate.

FIG. 7 shows the locking lever 17, the stopper 15, and the locking release portion 21 in the reference state. Referring to FIG. 7, since a position in which the locking release portion 21 be brought into contact with the release arm 25 of the locking lever 17 is positioned above the shaft of the locking lever 17, when the locking release portion 21 is moved to the left side in the drawing, that is, is moved forward relative to the vehicle body, the release arm 25 of the locking lever 17 is rotated counterclockwise so that the hook arm 23 is released from the stopper 15.

Meanwhile, when the locking device 9 is released, the connecting duct 7 may be separated from the stopper 15 and be freely moved forward relative to the vehicle body. The connecting duct 7 is separated from the fixed duct 5 by the movement of the connecting duct 7, as shown in state A in FIG. 11.

In the above state, a restraining device is provided for restraining relative sliding of the connecting duct 7 and the moving duct 3, so that the connecting duct 7 is moved together with the moving duct when the moving duct 3 moved rearward is returned to the reference state.

The restraining device may be separately provided, but may be configured to be operated in conjunction with the locking device 9, causing a desirable result of reducing the number of parts.

In the exemplary embodiment of the present invention, the restraining device is implemented with the locking device 9 and configured to be operated in conjunction with each other.

That is, the locking lever 17 includes a restraining arm 27. The restraining arm 27 is configured to restrain the relative sliding of the connecting duct 7 and the moving duct 3 by the elastic force of the locking spring 19 when the hook arm 23 of the locking lever 17 is separated from the stopper 15.

Furthermore, the locking release portion 21 is provided on a lower plate 29 fixed to a lower side of the moving duct 3; and the lower plate 29 has a restraining hole 31 into which the restraining arm 27 of the locking lever 17 is inserted to restrain the moving duct 3 to the connecting duct 7.

Figure 12A:
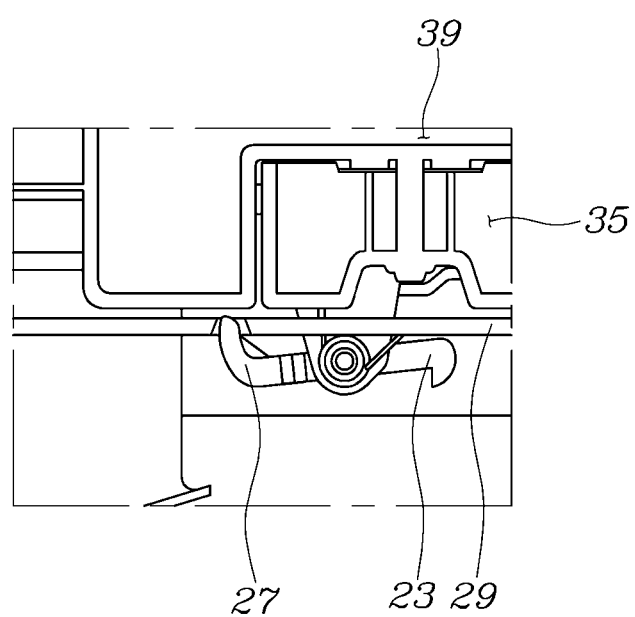
FIG. 12A, FIG. 12B, and FIG. 12C are views showing behavior of the locking lever in a response to movement of a moving duct.
Figure 12B:
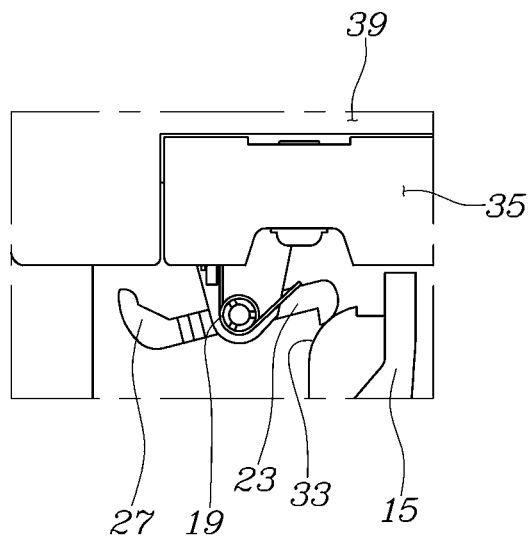
Figure 12C:
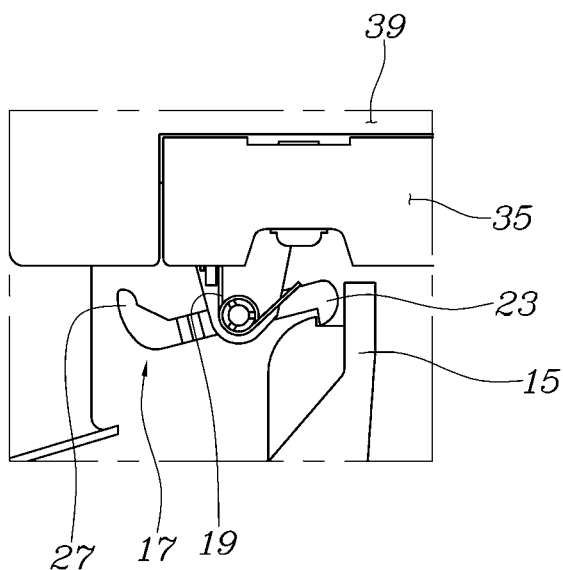

Therefore, in the state A in FIG. 11, the restraining arm 27 of the locking lever 17 is inserted into the restraining hole 31 of the lower plate 29 by the elastic force of the locking spring 19 so that the moving duct 3 and the connecting duct 7 are restrained each other as shown state A in FIG. 12. Whereby when the moving duct 3 is moved rearward thereof, the connecting duct 7 may be moved together with the moving duct 3.

The stopper 15 is integrally formed with a guide portion 33. The guide portion 33 guides the hook arm 23 to be rotated and allows the restraining arm 27 to be released from the restraining hole 31 and then allows the hook arm 23 to be locked to the stopper 15 as the locking lever 17 approaches to the stopper 15 with the restraining arm 27 inserted in the restraining hole 31.

That is, when the moving duct 3 is moved rearward from state A in FIG. 11 or state A in FIG. 12, the hook arm 23 of the locking lever 17 is locked to the stopper 15 with state C in FIG. 12 through state B in FIG. 12 immediately before state B in FIG. 11. During the change from state B to state C in FIG. 12, the hook arm 23 is moved rearward and is brought into contact with the guide portion 33 of the stopper 15 to be guided, being rotated counterclockwise. Accordingly, the elastic force of the locking spring 19 is continuously applied to the locking lever 17, so that the hook arm 23 is rotated clockwise again to form the locked state as shown in state C in FIG. 12.

As an example, state C in FIG. 12 remains the same even when the moving duct 3 is rearward than the reference state as in state C in FIG. 11.

In the exemplary embodiment of the present invention, in the housing 1, the storage box 13 is provided above the straight section of the moving duct 3 configured to overlap with the connecting duct 7; the moving duct 3 is fixed to the storage box 13; the shaft of the locking lever 17 is fixed to a lower moving block 35 integrally formed at a lower side of the connecting duct 7; and the locking release portion 21 is integrally provided with the lower plate 29 fixed to the lower side of the moving duct 3.

A straight guide 37 is provided on an upper side of the connecting duct 7 to guide the relative linear sliding of the connecting duct 7 and the storage box 13.

An upper moving block 39 is provided above the connecting duct 7 and coupled to an upper side of the lower moving block 35 and the straight guide 37 is provided between the upper moving block 39 and the storage box 13.

The connecting duct 7 is integrally formed while being covered by the upper moving block 39 at the upper side and the lower moving block 35 at the lower side thereof. The shaft of the locking lever 17 and the locking spring 19 are provided at a lower side of the lower moving block 35 and the straight guide 37 is provided between the upper moving block 39 and the storage box 13, so that the movement of the storage box 13 when the storage box 13 is moved relative to the connecting duct 7 together with the moving duct 3 may be smoothly and stably guided.

In the exemplary embodiment of the present invention, the moving console includes: a slider 41 fixed to a lower side of the lower plate 29; guide rails 43 fixed to the vehicle body to guide linear sliding of the slider 41 relative to the vehicle body; and a drive motor 45 configured to supply power for moving the slider 41 along the guide rails 43 so that the lower plate 29, the moving duct 3, and the housing 1 linearly slide.

Accordingly, when the present invention is configured such that, when the drive motor 45 is operated by a separate operating switch, as the slider 41 linearly slides along the guide rails 43, the housing 1 and the moving duct 3 are moved and thus a position of the moving console may be varied relative to the vehicle body.

As an example, the configuration in which the slider 41 is linearly slid by the rotational force of the drive motor 45 may be realized by conventional variable linear operating device such as a lead screw.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A movable console for a vehicle, the movable console comprising:
   a housing which is slidable on a vehicle body;
   a moving duct mounted in the housing and slidable with the housing;
   a connecting duct configured to slide relative to sliding of the moving duct and to supply air received from a fixed duct fixed to the vehicle body to the moving duct; and
   a locking device configured to lock or unlock the connecting duct at a position of the fixed duct where an entrance of the connecting duct fluidically communicates with the fixed duct,
   wherein the moving duct includes a straight section slidably coupled with the connecting duct while being fitted over a portion of the connecting duct, maintaining in fluidical communication with the connecting duct continuously while the moving duct slides in a direction away from the connecting duct, and
   wherein the locking device includes:
   a stopper fixed to the vehicle body;
   a locking lever rotatably connected to the connecting duct, wherein a locking state of the locking lever to the stopper is changed according to a rotation angle of the locking lever; and
   a locking spring configured to apply an elastic force to the locking lever in a direction in which the locking lever is locked to the stopper.

2. The movable console of claim 1, wherein the locking device further includes:
   a locking release portion fixed to the moving duct to release the locking state of the locking lever from the stopper as the moving duct slides in a direction closer to the connecting duct.

3. The movable console of claim 2, wherein the locking release portion is configured to release the locking state of the locking lever from the stopper by rotating the locking lever as the moving duct slides in the direction closer to the connecting duct.

4. The movable console of claim 3,
   wherein the stopper is positioned below the connecting duct;
   wherein the locking release portion is configured to enter a gap between an upper end portion of the stopper and the connecting duct by sliding thereof; and
   wherein a shaft of the locking lever is positioned below a linear sliding trajectory of the locking release portion.

5. The movable console of claim 4, wherein the locking lever includes:
   a hook arm configured to be locked to the stopper by the elastic force of the locking spring; and
   a release arm integrally formed with the hook arm to be selectively rotated by the locking release portion to release the hook arm from the stopper.

6. The movable console of claim 5, wherein the locking lever further includes:
   a restraining arm configured to restrain relative sliding of the connecting duct and the moving duct by the elastic force of the locking spring when the hook arm of the locking lever is released from the stopper.

7. The movable console of claim 6,
   wherein the locking release portion is provided on a lower plate fixed to a lower side of the moving duct, and
   wherein the lower plate has a restraining hole into which an end portion of the restraining arm of the locking lever is selectively inserted to restrain the moving duct relative to the connecting duct.

8. The movable console of claim 7, wherein the stopper integrally has a guide portion, which guides the hook arm to be rotated and allows the restraining arm to be released from the restraining hole and then allows the hook arm to be locked to the stopper as the locking lever approaches to the stopper with the restraining arm inserted into the restraining hole.

9. The movable console of claim 2,
   wherein, in the housing, a storage box is provided above the straight section of the moving duct,
   wherein the moving duct is fixed to the storage box,
   wherein a shaft of the locking lever is fixed to a lower moving block integrally provided at a lower side of the connecting duct, and
   wherein the locking release portion is provided at a lower plate fixed to a lower side of the moving duct.

10. The movable console of claim 9, wherein the connecting duct includes a straight guide provided on an upper side thereof to guide linear sliding of the connecting duct relative to the storage box.

11. The movable console of claim 10,
    wherein an upper moving block is provided above the connecting duct and coupled to an upper side of the lower moving block, and
    wherein the straight guide is provided between the upper moving block and the storage box.

12. The movable console of claim 9, further including:
    a slider fixed to a lower side of the lower plate;
    guide rails securely provided on the vehicle body to guide linear sliding of the slider relative to the vehicle body; and
    a drive motor configured to supply power for moving the slider along the guide rails so that the lower plate, the moving duct, and the housing perform linear sliding.

13. The movable console of claim 1, further including:
    a restraining device configured to restrain the relative sliding of the connecting duct and the moving duct when the locking device is unlocked and the connecting duct is separated from the fixed duct.

14. The movable console of claim 13, wherein the restraining device is configured to be operated in conjunction with the locking device.

* * * * *